United States Patent
Schmidhuber et al.

[11] Patent Number: 6,125,591
[45] Date of Patent: Oct. 3, 2000

[54] SEAL SYSTEM FOR A DOOR, PREFERABLY ON A MOTOR VEHICLE

[75] Inventors: Horst Schmidhuber, Schondorf; Jochen Haussmann, Starnberg, both of Germany

[73] Assignee: Webasto Tursysteme GmbH, Stockdorf, Germany

[21] Appl. No.: 09/009,360

[22] Filed: Jan. 20, 1998

[30] Foreign Application Priority Data

Jan. 18, 1997 [DE] Germany ............................ 197 01 681

[51] Int. Cl.[7] ............................................. E06B 7/18
[52] U.S. Cl. ...................... 49/477.1; 49/483.1; 49/489.1; 49/26
[58] Field of Search .................. 49/483.1, 475.1, 49/477.1, 489.1, 26–28, 368, 369; 277/644–646, 647, 639, 921

[56] References Cited

U.S. PATENT DOCUMENTS

| | | | |
|---|---|---|---|
| 2,530,160 | 11/1950 | Finley | 49/477.1 |
| 2,700,196 | 1/1955 | Panhard | 49/489.1 X |
| 3,461,611 | 8/1969 | Axe | 49/483.1 |
| 3,727,348 | 4/1973 | Steinmann et al. | 49/28 |
| 4,579,192 | 4/1986 | Mueller | 49/477.1 X |
| 4,773,183 | 9/1988 | Okushima et al. | 49/28 |
| 4,870,783 | 10/1989 | Hermann et al. | 49/477.1 |

FOREIGN PATENT DOCUMENTS

| | | | |
|---|---|---|---|
| 000466531 | 1/1992 | France | 49/477.1 |
| 30 28 445 | 2/1982 | Germany . | |
| 34 10 742 | 9/1984 | Germany . | |

*Primary Examiner*—Daniel P. Stodola
*Assistant Examiner*—Hugh B. Thompson
*Attorney, Agent, or Firm*—Nixon Peabody LLP; David S. Safran

[57] ABSTRACT

A seal system for a door (2), preferably on a motor vehicle, with a frame seal (4) which on the door frame (10) which has at least one hollow chamber (5) which can be pressurized with different pressures. A seal surface (6) facing the door (2) assumes a concave shape under minimum pressure and a convex shape under maximum pressure. The area of the door seal (3) which fits against the frame seal (4) with the door closed has a contact surface with a contour which is complementary to the outside contour of the seal surface (6) with the hollow chamber (5) expanded. The frame seal (4) has at least one seal part (7A, 7B) projects beyond the seal surface (6) towards the contact surface of door seal (3) for protection of the seal surface (6) and for improving the sealing action of the seal system when the seal surface (6) has a concave shape.

20 Claims, 2 Drawing Sheets

SEAL SYSTEM FOR A DOOR, PREFERABLY ON A MOTOR VEHICLE

BACKGROUND OF THE INVENTION

1. Field of the Invention

The invention relates to a seal system for a door, preferably on a motor vehicle. In particular, the invention relates to a seal having frame seal made on a door frame and having at least one hollow chamber which can be pressurized with different pressures, and which has a seal surface facing the door which assumes a concave shape under minimum pressure and a convex shape under maximum pressure. Still further, to such a door seal which fits against the frame seal with the door closed and which, in the area of its contact surface facing towards the frame seal, has a contour which is complementary to the outside contour of the seal surface when the hollow chamber is expanded.

2. Description of Related Art

A seal system of the type to which this invention is directed is known from published German Patent Application No. 34 10 742 A1. In this seal system, a hollow chamber seal on the door frame side of the door is pressurized in the closed position, by which a seal surface facing the door is inserted in a recess of a massive door seal. The seal surface of the hollow chamber seal, which can be moved by applying pressure, is exposed to premature wear by articles and individuals brushing past when embarking and disembarking. Since the door seal is made massive as the counterpart of the frame seal, in addition only a limited tolerance equalization is possible in the direction of the width of the door plate.

SUMMARY OF THE INVENTION

A primary object of the present invention is to provide an improved seal system with a wear-protected seal surface and improved tolerance equalization.

This object is achieved by the frame seal having at least one seal part which, when the seal surface has a concave shape, projects beyond it towards the contact surface of the door seal.

Because the frame seal has at least one seal part which projects beyond the seal surface for a concave shape of the seal surface, i.e., when the hollow chamber seal is retracted from the contact surface of the door seal, on the one hand, the seal surface is protected by the projecting seal part, and on the other, the additional seal part used as protection, in addition to performing other functions, for example, improved tolerance equalization, can be used to obtain anti-pinching functions and improved sealing and noise attenuation.

One embodiment is advantageous in which, on each of the outside and inside of the frame seal, there is a respective projecting seal part. In this way, the seal surface of the hollow chamber seal is protected both against damage from the outside and also from the inside of the door.

To enhance the sealing action and to improve noise attenuation, especially for the door of a fast moving vehicle, it is advantageous if there are additional contact surfaces on the door seal for the projecting seal parts of the frame seal. Thus, for each projecting seal part, on the outside and inside, there three seal surfaces per door gap are provided jointly with the seal surface of the hollow chamber seal, resulting in much improved noise attenuation and sealing effect.

According to an advantageous development, it is provided that the projecting seal parts accommodate at least one sensor part that is used to detect pinching of individuals or articles between the door seal and the frame seal. The projecting seal parts thus serve a dual purpose in that they not only protect the movable seal surface of the hollow chamber seal against damage, but also prevent pinching of individuals or articles at the same time. This integrated sensor technology is preferably formed by a pressure medium hose being integrated in the seal part. These tubular hollow chambers are connected to a pressure pulse switch of the type known generally for a window glass seal of a motor vehicle, for example, from German Patent No. 30 28 445 C2.

Improved tolerance equalization in the extended direction of the door plate arises by the door seal having at least one compressible hollow chamber which co-acts with the contact surfaces on the frame seal. To do this, there is especially a central hollow chamber which is located behind the contact surface of the door seal and which is bounded to the inside, towards the door, by a base part of the door seal and to the outside by the back of the contact surface. This central hollow chamber is partially compressed when the hollow chamber of the frame seal is inflated, and thus, ensures a smooth fit of the sealing surface and contact surface.

For improved tolerance equalization, perpendicular to the extension of the door plate, it is advantageous if the base part of the door seal has a centrally arranged centering groove and the back of the contact surface has a centering rib which can be engaged to it. In this way, when the hollow chamber of the frame seal is inflated, by pressing the centering rib into the centering groove, the door plate is centered relative to the door frame.

Alternatively or additionally, it is advantageous for improved centering if the base part has an outside contour which is trapezoidal in cross section, with oblique surfaces used to abut a centering surface which is provided on the inside of the inner and outer contact surface and which is shaped complementary thereto. By means of this configuration, improved centering perpendicular to the plane of the door leaf is likewise ensured above the projecting seal parts of the frame seal in interaction with their contact surfaces on the door seal. To improve tolerance equalization in the direction of the extension of the door leaf, it is in turn advantageous if, between the inner and outer contact surfaces and the base part of the door seal, there is a lateral hollow chamber each. In this way, the door seal is designed to have at least two walls in its entire compression area; this increases its stability with simultaneously low material consumption.

According to an especially advantageous embodiment, it is provided that the sealing surface, in its base unpressurized position, has a concave, i.e. retracted contour. When used in a vehicle, this has the advantage that, when a pressure or vacuum source fails, the doors can be opened at any time without greater resistance and that, moreover, in the rest state of the vehicle when embarking and disembarking they are located automatically in their withdrawn, i.e. protected position. The hollow chamber is thus inflated only when the vehicle is operating, in which here there can be a speed-dependent pressure increase, as is already fundamentally known from the initially mentioned prior art according to the German Patent Application No. 34 10 742 mentioned above. This inflation of the hollow chamber of the frame seal is easily possible in operation of a vehicle, especially in passenger conveyance vehicles or commercial vehicles with a compressed air braking system, since in operation the required air pressure is available anyway.

Even if it is much easier to provide a pressurized hollow chamber on the stationary frame seal, embodiments are also covered in which the arrangement is the reverse, i.e. in which the door seal is provided with a pressurized hollow chamber seal. Likewise, the invention may also be applied to multi-panel doors, in which case the door and the "frame" seal can also be located on two adjacent door leaves if desired.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENTS

In vehicle wall 1, a door 2 is provided for selectively closing or exposing an entry opening. Door 2 can be a vehicle door of any type of land vehicle, marine vessel or aircraft, or even an elevator. On the other hand, it can be a door of a stationary facility, for example, a sound-proof or refrigerated room.

The seal system of the invention can be used to advantage wherever a high sealing effect and/or noise attenuation is important.

Figure 4:
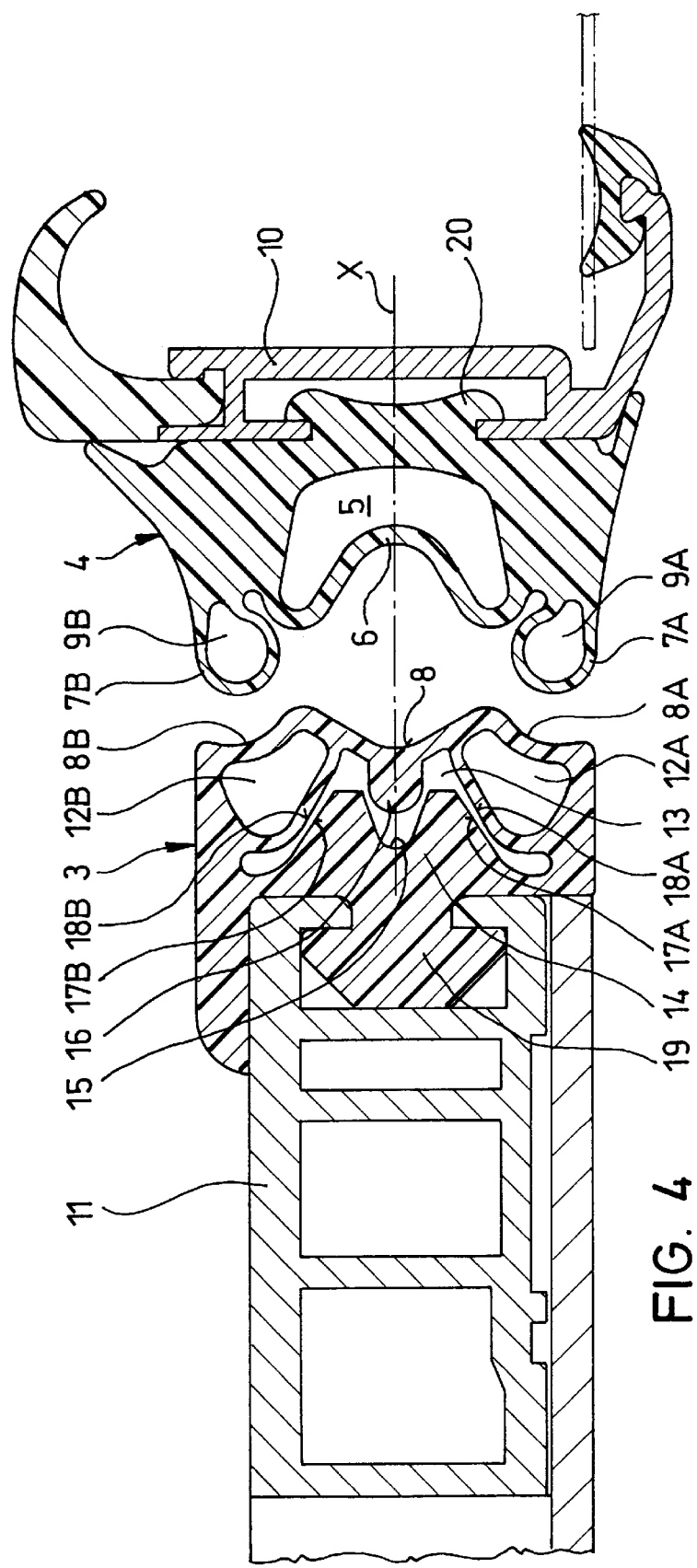
FIG. 4 shows an enlarged representation, similar to that of FIG. 2, but with the door not yet completely closed.

Door 2 has peripheral door seal 3. A foot part 19 (FIG. 4) of door seal 3 is inserted into an undercut part of a frame profile 11 of door 2 and is attached in this way.

The door system also includes a frame seal 4 which is attached by inserting a foot part 20 (FIG. 4) into an undercut profile of door frame 10 which, in this case, is of the type used as a side portal frame of vehicle. Frame seal 4, in its middle area, i.e. in the area of middle longitudinal axis X of door 2, has a hollow chamber 5 which is bounded towards door frame 10 by a base part of frame seal 4 and towards the door 2 by a flexible seal surface 6.

Figure 1:
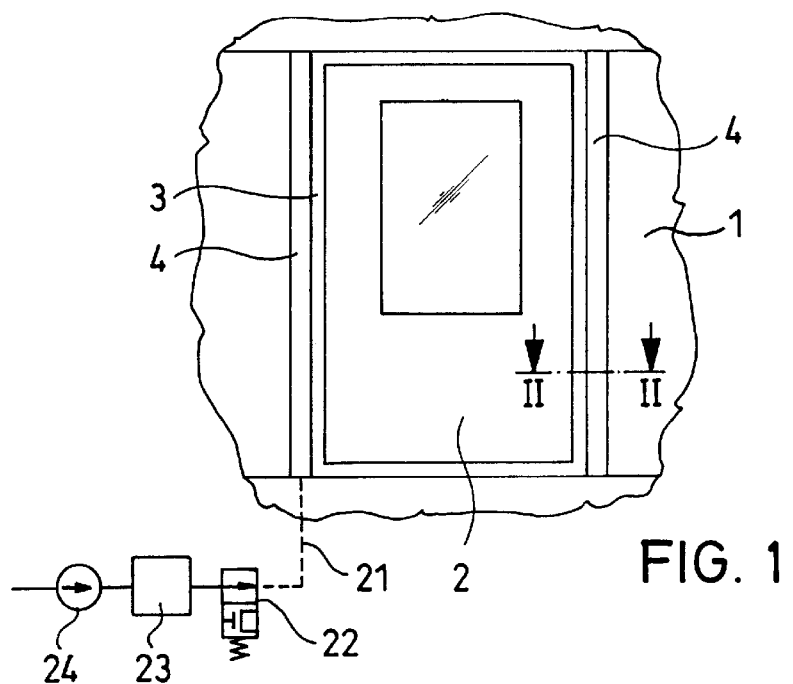
FIG. 1 shows a schematic partial side view of a vehicle wall with a door provided therein.
Figure 2:
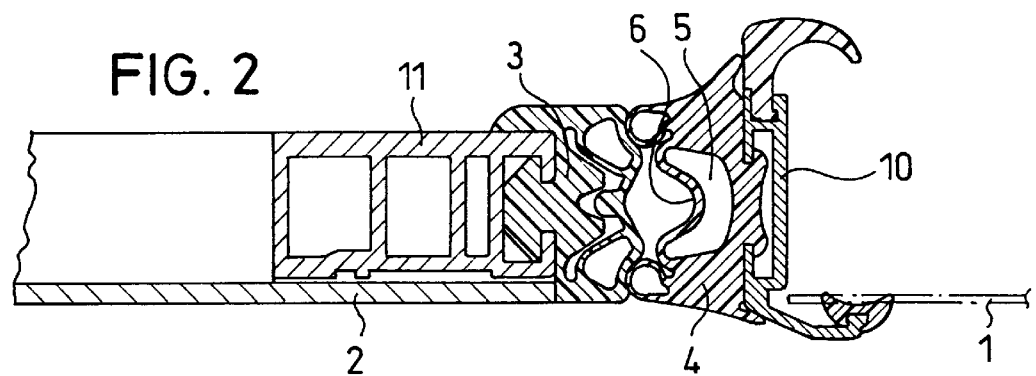
FIG. 2 shows a cross section through the seal system, taken along line II—II in FIG. 1, with the hollow chamber evacuated.

Hollow chamber 5 can be pressurized with compressed air, via a pressure line 21 shown in FIG. 1 and a multipath valve 22, by a pressure vessel 23 which is supplied by a compressor 24. In the other switch position of multipath valve 22, the connection to pressure vessel 23 is broken and pressure line 21 is vented.

In the vented base position, sealing surface 6 has a concave contour retracted inward. It is thus protected by seal part 7A on the outside and seal part 7B on the inside of frame seal 4. Projecting seal parts 7A and 7B are preferably formed as an integral, i.e., of one-piece, with frame seal 4; but, they can also be formed as separate seal parts located laterally of frame seal 4 according to an alternative embodiment.

Figure 3:
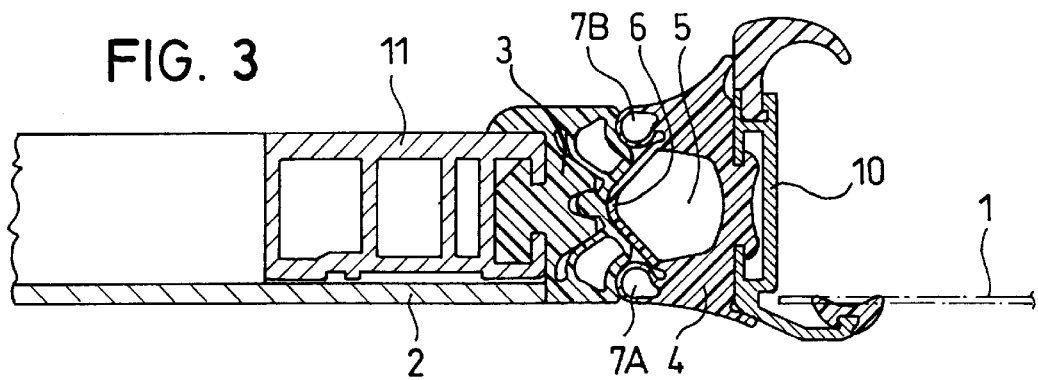
FIG. 3 is a cross-sectional view corresponding to that of FIG. 2, but with a pressurized hollow chamber.

Opposite seal surface 6, on door seal 3, there is central contact surface 8 which, in cross section, is in the shape of a V with a rounded tip. The shape of this central contact surface 8 forms a complementary shape to the contour of seal surface 6 of hollow chamber 5 when the surface 6 has assumed the convex shape shown in FIG. 3 by pressurization of chamber 5.

Central contact surface 8 outwardly adjoins a contact surface 8A having the contour of a circle segment and likewise adjoins a contact surface 8B with the contour of a circle segment to the inside. When door 2 is closed, projecting seal parts 7A and 7B of frame seal 4 rest tightly against these contact surfaces 8A and 8B, respectively.

The interior of projecting seal parts 7A and 7B of frame seal 4 constitute a pressure medium hose 9A, 9B, respectively, each of which, in turn, form part of sensor technology which is used to detect pinching of individuals or articles between door seal 3 and frame seal 4. Thus projecting seal parts 7A and 7B have a multiple function. They protect seal surface 6 against damage in its withdrawn, concave state, they also protect individuals or articles against pinching, and thus at the same time, the door mechanisms against damage. Furthermore, they also protect seal surface 6 against damage with the door closed and hollow chamber 5 pressurized since, in case of attempted insertion into the door gap, compression of pressure medium hose 9A, 9B can be used at the same time to trigger venting of the hollow chamber 5 and to initiate a door opening process.

To increase tolerance equalization of the seal system in the direction of extension of the door plate, and at the same time, to provide for improved centering perpendicular to the plane of door 2, door seal 3 also has two lateral hollow chambers 12A and 12B and a central hollow chamber 13 in its interior. Central hollow chamber 13 is bounded on its inside facing the door by base part 14, which adjoins foot part 19. Base part 14, in cross section, as an envelope curve has a roughly trapezoidal shape. Two outlying oblique surfaces 17A and 17B of this trapezoidal contour taper in the direction of frame seal 4.

At the height of the center axis of the door system, a centering groove 15 is molded into the narrower end surface of the trapezoidal contour of base part 14. Groove 15 has two lateral oblique surfaces which taper towards door 2 and a rounded groove bottom. Opposite centering groove 15 on the back of central contact surface 8 is a raised centering rib 16 which has a rounded cross section on its edge facing centering groove 15.

Opposite trapezoidal oblique surfaces 17A and 17B are centering surfaces 18A and 18B which border central hollow chamber 13 to the outside in the same way as the centering rib 16 in the middle part. Centering surfaces 18A or 18B, furthermore, also border lateral hollow chambers 12A and 12B to the inside.

When door 2 is closed, first of all, outer contact surface 8A and inner contact surface 8B adjoin projecting seal parts 7A and 7B. Then, in vehicle applications, preferably depending on a certain vehicle speed, hollow chamber 5 is pressurized with compressed air via the pressure line 21, causing it to assume the convex shape shown in FIG. 3. In static environments, a predetermined pressurization can be produced instead. In this way, seal surface 6 is pressed tightly against the complementary contour of contact surface 8. In doing so, at the same time, centering rib 16 is pressed into centering groove 15 and centering surfaces 18A, 18B rest against the oblique surfaces 17A, 17B of door seal 3. Door 2 is thus centered towards center axis X. It thus always achieves a flush appearance with vehicle wall 1. Parts tolerances both in the direction of the X-axis and also perpendicularly thereto are outstandingly equalized. Additionally, the form-fitted engagement of seal surface 6 with contact surface 8 and of seal parts 7A, 7B with contact surfaces 8A, 8B, the door leaf is held securely and without vibration even at high speeds and the noise level in the interior is effectively reduced.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Seal system for door comprising:
    a frame seal for mounting on a door frame, said frame seal having at least one hollow chamber which is pressurizable and depressurizable, and having a first seal part with an outwardly facing seal surface, said facing seal facing seal surface assuming a concave shape in an unpressurized position and a convex shape in a pressurized position;
    a door seal for mounting on a door, said door seal having a contact surface which fits against the frame seal, in use, in a closed position of the door to which it is mounted, an area of the contact surface which faces towards the frame seal having a contour which is complementary to an outside contour of the convex shape of the seal surface;
    wherein the frame seal has at least one additional seal part and the door seal has at least one additional contact surface, said at least one additional seal part projecting outwardly beyond said seal surface to mate with the at least one additional contact surface of said door seal, at least when the seal surface has said concave shape.

2. Seal system as claimed in claim 1, wherein said at least one additional seal part comprises an outwardly projecting seal part located at each of an outer side and an inner side of the frame seal.

3. Seal system as claimed in claim 2, wherein the projecting seal parts form part of sensor technology for detect pinching of individuals or articles between the door seal and frame seal.

4. Seal system as claimed in claim 3, wherein the sensor technology is formed by a pressure medium hose integrated into the seal parts.

5. Seal system as claimed in claim 2, wherein the door seal has additional contact surfaces for the projecting seal parts.

6. Seal system as claimed in claim 5, wherein the door seal has at least one compressible hollow chamber associated with each of the contact surfaces.

7. Seal system as claimed in claim 5, wherein the door seal has a central hollow chamber which is located behind the contact surface against which the frame seal fits, the central hollow chamber being inwardly bounded by a base part of the door seal and being outwardly bounded by a rear side of the contact surface.

8. Seal system as claimed in claim 7, wherein the base part has a centrally located centering groove; and wherein the rear side of the contact surface has a centering rib which is engagable in the centering groove.

9. Seal system as claimed in claim 7, wherein the base part has an outside contour which is trapezoidal in cross section; wherein an oblique centering surface is provided each of lateral sides of said central hollow chamber; and wherein the trapezoidal cross section has oblique surfaces for abutting the oblique centering surfaces which are shaped complementary thereto.

10. Seal system as claimed in claim 9, wherein a lateral hollow chamber is provided between each of the additional contact surfaces and the base part of the door seal.

11. Seal system as claimed in claim 10, wherein the lateral hollow chambers are inwardly bounded by the centering surfaces.

12. Seal system as claimed in claim 1, wherein the door seal has a central hollow chamber which is located behind the contact surface against which the frame seal fits, the central hollow chamber being inwardly bounded by a base part of the door seal and being outwardly bounded by a rear side of the contact surface.

13. Seal system as claimed in claim 12, wherein the base part has a centrally located centering groove; and wherein the rear side of the contact surface has a centering rib which is engagable in the centering groove.

14. Seal system as claimed in claim 1, further comprising means for pressurizing and venting said at least one hollow chamber.

15. A door arrangement having a door, a door frame and a seal system, comprising:
    a frame seal mounted on the door frame, said frame seal having at least one hollow chamber which is pressurizable and depressurizable, and having an outwardly facing seal surface, said facing seal surface assuming a concave shape in an unpressurized position and a convex shape in a pressurized position;
    a door seal mounted on the door, said door seal having a contact surface which fits against the frame seal in a closed position of the door, an area of the contact surface which faces towards the frame seal having a contour which is complementary to an outside contour of the convex shape of the seal surface;
    wherein the frame seal has at least one additional seal part and the door seal has at least one additional contact surface, said at least one additional seal part projecting outwardly beyond said seal surface to mate with the at least one additional contact surface of said door seal, at least when the seal surface has said concave shape.

16. Door arrangement as claimed in claim 15, wherein said at least one additional seal part comprises an outwardly projecting seal part located at each of an outer side and an inner side of the frame seal.

17. Door arrangement as claimed in claim 16, wherein the door seal has additional contact surfaces for the projecting seal parts.

18. Door arrangement as claimed in claim 17, wherein the door is a vehicle door and said door frame is a vehicle portal.

19. Door arrangement as claimed in claim 16, wherein the projecting seal parts form part of sensor technology for detect pinching of individuals or articles between the door seal and frame seal.

20. Door arrangement as claimed in claim 19, wherein the sensor technology is formed by a pressure medium hose integrated into the seal parts.

* * * * *